(12) United States Patent
Mejdrich et al.

(10) Patent No.: US 8,898,396 B2
(45) Date of Patent: *Nov. 25, 2014

(54) SOFTWARE PIPELINING ON A NETWORK ON CHIP

(75) Inventors: Eric O. Mejdrich, Preston, WA (US);
Paul E. Schardt, Rochester, MN (US);
Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/453,380

(22) Filed: Apr. 23, 2012

(65) Prior Publication Data
US 2012/0209944 A1 Aug. 16, 2012

Related U.S. Application Data

(63) Continuation of application No. 11/938,376, filed on Nov. 12, 2007, now Pat. No. 8,261,025.

(51) Int. Cl.
*G06F 12/00* (2006.01)
*G06F 13/00* (2006.01)
(Continued)

(52) U.S. Cl.
CPC .............. *H04L 49/15* (2013.01); *H04L 49/901* (2013.01); *H04L 49/109* (2013.01); *H04L 49/3036* (2013.01); *H04L 49/90* (2013.01); *H04L 49/252* (2013.01)
USPC .......................................... 711/147; 712/220

(58) Field of Classification Search
None
See application file for complete search history.

(56) References Cited

U.S. PATENT DOCUMENTS 4,813,037 A   3/1989  Debuysscher et al.
(Continued)

FOREIGN PATENT DOCUMENTS

CN   1599471 A   3/2005
JP   01283663    11/1989
(Continued)

OTHER PUBLICATIONS

Hansson et al. "Avoiding Message-Dependent Deadlock in Network-Based Systems on Chip", Jan. 6-10, 2007, vol. 2007, 10 pages.
(Continued)

*Primary Examiner* — Andrew Caldwell
*Assistant Examiner* — George Giroux
(74) *Attorney, Agent, or Firm* — Biggers Kennedy Lenart Spraggins, LLP

(57) ABSTRACT

Memory sharing in a software pipeline on a network on chip ('NOC'), the NOC including integrated processor ('IP') blocks, routers, memory communications controllers, and network interface controllers, with each IP block adapted to a router through a memory communications controller and a network interface controller, where each memory communications controller controlling communications between an IP block and memory, and each network interface controller controlling inter-IP block communications through routers, including segmenting a computer software application into stages of a software pipeline, the software pipeline comprising one or more paths of execution; allocating memory to be shared among at least two stages including creating a smart pointer, the smart pointer including data elements for determining when the shared memory can be deallocated; determining, in dependence upon the data elements for determining when the shared memory can be deallocated, that the shared memory can be deallocated; and deallocating the shared memory.

15 Claims, 7 Drawing Sheets

(51) Int. Cl.
*G06F 13/28* (2006.01)
*H04L 12/879* (2013.01)
*H04L 12/933* (2013.01)
*H04L 12/861* (2013.01)
*H04L 12/935* (2013.01)
*H04L 12/947* (2013.01)

(56) References Cited

U.S. PATENT DOCUMENTS

| | | | |
|---|---|---|---|
| 4,951,195 A | 8/1990 | Fogg et al. | |
| 5,167,023 A | 11/1992 | De Nicolas et al. | |
| 5,301,302 A | 4/1994 | Blackard et al. | |
| 5,442,797 A | 8/1995 | Casavant et al. | |
| 5,590,308 A | 12/1996 | Shih | |
| 5,761,516 A | 6/1998 | Rostoker et al. | |
| 5,784,706 A | 7/1998 | Oberlin et al. | |
| 5,802,386 A | 9/1998 | Kahle et al. | |
| 5,870,479 A | 2/1999 | Feiken et al. | |
| 5,872,963 A | 2/1999 | Bitar et al. | |
| 5,884,060 A | 3/1999 | Vegesna et al. | |
| 5,887,166 A | 3/1999 | Mallick et al. | |
| 5,974,487 A | 10/1999 | Hartmann | |
| 6,021,470 A | 2/2000 | Frank et al. | |
| 6,044,478 A | 3/2000 | Green | |
| 6,047,122 A | 4/2000 | Spiller | |
| 6,049,866 A | 4/2000 | Earl | |
| 6,085,296 A | 7/2000 | Karkhanis et al. | |
| 6,085,315 A | 7/2000 | Fleck et al. | |
| 6,092,159 A | 7/2000 | Ekner et al. | |
| 6,101,599 A | 8/2000 | Wright et al. | |
| 6,105,119 A * | 8/2000 | Kerr et al. | 711/219 |
| 6,119,215 A | 9/2000 | Key et al. | |
| 6,145,072 A | 11/2000 | Shams et al. | |
| 6,151,668 A | 11/2000 | Pechanek et al. | |
| 6,164,841 A | 12/2000 | Mattson et al. | |
| 6,179,489 B1 * | 1/2001 | So et al. | 718/102 |
| 6,272,598 B1 | 8/2001 | Arlitt et al. | |
| 6,292,888 B1 | 9/2001 | Nemirovksy et al. | |
| 6,298,370 B1 * | 10/2001 | Tang et al. | 718/102 |
| 6,370,622 B1 | 4/2002 | Chiou et al. | |
| 6,434,669 B1 | 8/2002 | Arimilli et al. | |
| 6,446,171 B1 | 9/2002 | Henriksen | |
| 6,493,817 B1 | 12/2002 | Renstrom | |
| 6,519,605 B1 | 2/2003 | Gilgen et al. | |
| 6,567,084 B1 | 5/2003 | Mang et al. | |
| 6,567,895 B2 | 5/2003 | Scales | |
| 6,591,347 B2 | 7/2003 | Tischler et al. | |
| 6,625,662 B1 | 9/2003 | Satoh et al. | |
| 6,668,307 B1 | 12/2003 | Damron | |
| 6,668,308 B2 | 12/2003 | Barroso et al. | |
| 6,675,284 B1 | 1/2004 | Warren | |
| 6,697,932 B1 | 2/2004 | Yoaz et al. | |
| 6,725,317 B1 | 4/2004 | Bouchier et al. | |
| 6,823,429 B1 | 11/2004 | Olnowich | |
| 6,832,184 B1 | 12/2004 | Bleier et al. | |
| 6,877,086 B1 | 4/2005 | Boggs et al. | |
| 6,891,828 B2 | 5/2005 | Ngai | |
| 6,898,791 B1 | 5/2005 | Chandy et al. | |
| 6,915,402 B2 | 7/2005 | Wilson et al. | |
| 6,938,253 B2 | 8/2005 | Kim | |
| 6,950,438 B1 | 9/2005 | Owen et al. | |
| 6,961,824 B2 | 11/2005 | Rowlands et al. | |
| 6,973,032 B1 | 12/2005 | Casley et al. | |
| 6,988,149 B2 | 1/2006 | Odenwald | |
| 7,010,580 B1 | 3/2006 | Fu et al. | |
| 7,015,909 B1 | 3/2006 | Morgan, III et al. | |
| 7,020,751 B2 | 3/2006 | Kershaw | |
| 7,072,996 B2 | 7/2006 | Adusumilli et al. | |
| 7,162,560 B2 | 1/2007 | Taylor et al. | |
| 7,376,789 B2 | 5/2008 | Halleck et al. | |
| 7,394,288 B1 | 7/2008 | Agarwal | |
| 7,398,374 B2 | 7/2008 | DeLano | |
| 7,464,197 B2 | 12/2008 | Ganapathy et al. | |
| 7,478,225 B1 | 1/2009 | Brooks et al. | |
| 7,493,474 B1 | 2/2009 | Pechanek et al. | |
| 7,500,060 B1 | 3/2009 | Anderson et al. | |
| 7,502,378 B2 | 3/2009 | Lajolo et al. | |
| 7,521,961 B1 | 4/2009 | Anderson et al. | |
| 7,533,154 B1 | 5/2009 | Chen et al. | |
| 7,539,124 B2 | 5/2009 | Rhim et al. | |
| 7,546,444 B1 | 6/2009 | Wolrich et al. | |
| 7,568,064 B2 | 7/2009 | Reblewski et al. | |
| 7,590,774 B2 | 9/2009 | Johns et al. | |
| 7,613,882 B1 | 11/2009 | Akkawi et al. | |
| 7,664,108 B2 | 2/2010 | Bahattab | |
| 7,689,738 B1 | 3/2010 | Williams et al. | |
| 7,701,252 B1 | 4/2010 | Chow et al. | |
| 7,882,307 B1 | 2/2011 | Wentslaff et al. | |
| 7,886,084 B2 | 2/2011 | Chen et al. | |
| 8,214,624 B2 | 7/2012 | Berglas et al. | |
| 8,429,661 B1 | 4/2013 | Alfieri et al. | |
| 2002/0099833 A1 | 7/2002 | Steely et al. | |
| 2002/0178337 A1 | 11/2002 | Wilson et al. | |
| 2003/0065890 A1 | 4/2003 | Lyon | |
| 2004/0037313 A1 | 2/2004 | Gulati et al. | |
| 2004/0078482 A1 | 4/2004 | Blumrich et al. | |
| 2004/0083341 A1 | 4/2004 | Robinson et al. | |
| 2004/0088487 A1 | 5/2004 | Barroso et al. | |
| 2004/0111422 A1 | 6/2004 | Devarakonda et al. | |
| 2004/0111594 A1 | 6/2004 | Feiste et al. | |
| 2004/0151197 A1 | 8/2004 | Hui | |
| 2004/0153579 A1 | 8/2004 | Shih et al. | |
| 2004/0216105 A1 | 10/2004 | Burky et al. | |
| 2004/0250046 A1 | 12/2004 | Gonzalez et al. | |
| 2004/0260906 A1 | 12/2004 | Landin et al. | |
| 2005/0044319 A1 | 2/2005 | Olukotun | |
| 2005/0086435 A1 | 4/2005 | Todoroki | |
| 2005/0097184 A1 | 5/2005 | Brown et al. | |
| 2005/0149689 A1 | 7/2005 | Sodani et al. | |
| 2005/0160209 A1 | 7/2005 | Van Doren et al. | |
| 2005/0166205 A1 | 7/2005 | Oskin et al. | |
| 2005/0198442 A1 | 9/2005 | Mandler | |
| 2005/0203988 A1 | 9/2005 | Nollet et al. | |
| 2005/0238035 A1 | 10/2005 | Riley | |
| 2006/0095920 A1 | 5/2006 | Gossens | |
| 2006/0101249 A1 | 5/2006 | Bacon et al. | |
| 2006/0168430 A1 | 7/2006 | Walterscheidt et al. | |
| 2006/0190707 A1 | 8/2006 | Mcilvaine et al. | |
| 2006/0203825 A1 | 9/2006 | Beigne et al. | |
| 2006/0209846 A1 | 9/2006 | Clermidy et al. | |
| 2006/0242393 A1 | 10/2006 | Park et al. | |
| 2007/0055826 A1 | 3/2007 | Morton et al. | |
| 2007/0055961 A1 | 3/2007 | Callister et al. | |
| 2007/0074192 A1 | 3/2007 | Geisinger | |
| 2007/0076739 A1 | 4/2007 | Manjeshwar et al. | |
| 2007/0180310 A1 | 8/2007 | Johnson et al. | |
| 2007/0226407 A1 | 9/2007 | Radulescu et al. | |
| 2007/0239888 A1 | 10/2007 | Croxford | |
| 2007/0271557 A1 | 11/2007 | Geisinger | |
| 2007/0283324 A1 | 12/2007 | Geisinger | |
| 2008/0028401 A1 | 1/2008 | Geisinger | |
| 2008/0074433 A1 | 3/2008 | Jiao et al. | |
| 2008/0133885 A1 | 6/2008 | Glew | |
| 2008/0134191 A1 | 6/2008 | Warrier et al. | |
| 2008/0181115 A1 | 7/2008 | Soulie et al. | |
| 2008/0186998 A1 | 8/2008 | Rijpkema | |
| 2008/0198166 A1 | 8/2008 | Chung et al. | |
| 2008/0205432 A1 | 8/2008 | Gangwal | |
| 2008/0216073 A1 | 9/2008 | Yates et al. | |
| 2008/0307422 A1 | 12/2008 | Kurland et al. | |
| 2008/0320235 A1 | 12/2008 | Beckmann et al. | |
| 2009/0019190 A1 | 1/2009 | Blocksome | |
| 2009/0083263 A1 | 3/2009 | Felch et al. | |
| 2009/0109996 A1 | 4/2009 | Hoover et al. | |
| 2009/0122703 A1 | 5/2009 | Gangwal et al. | |
| 2009/0125574 A1 | 5/2009 | Mejdrich et al. | |
| 2009/0125703 A1 | 5/2009 | Mejdrich et al. | |
| 2009/0125706 A1 | 5/2009 | Hoover et al. | |
| 2009/0135739 A1 | 5/2009 | Hoover et al. | |
| 2009/0138567 A1 | 5/2009 | Hoover et al. | |
| 2009/0138670 A1 | 5/2009 | Mutlu et al. | |
| 2009/0157976 A1 | 6/2009 | Comparan et al. | |
| 2009/0182954 A1 | 7/2009 | Mejdrich et al. | |

(56) References Cited

U.S. PATENT DOCUMENTS

| | | |
|---|---|---|
| 2009/0187716 A1 | 7/2009 | Comparan et al. |
| 2009/0201302 A1 | 8/2009 | Hoover et al. |
| 2009/0210592 A1 | 8/2009 | Hoover et al. |
| 2009/0210883 A1 | 8/2009 | Hoover et al. |
| 2009/0213863 A1 | 8/2009 | Denteneer et al. |
| 2009/0245257 A1 | 10/2009 | Comparan et al. |
| 2009/0260013 A1 | 10/2009 | Heil et al. |
| 2009/0271172 A1 | 10/2009 | Mejdrich et al. |
| 2009/0271597 A1 | 10/2009 | Kuesel et al. |
| 2009/0276572 A1 | 11/2009 | Heil et al. |
| 2009/0282139 A1 | 11/2009 | Mejdrich et al. |
| 2009/0282197 A1 | 11/2009 | Comparan et al. |
| 2009/0282211 A1 | 11/2009 | Hoover et al. |
| 2009/0282214 A1 | 11/2009 | Kuesel et al. |
| 2009/0282221 A1 | 11/2009 | Heil et al. |
| 2009/0282222 A1 | 11/2009 | Hoover et al. |
| 2009/0282226 A1 | 11/2009 | Hoover et al. |
| 2009/0282227 A1 | 11/2009 | Hoover et al. |
| 2009/0282419 A1 | 11/2009 | Mejdrich et al. |
| 2009/0285222 A1 | 11/2009 | Hoover et al. |
| 2009/0287885 A1 | 11/2009 | Kriegel et al. |
| 2009/0307714 A1 | 12/2009 | Hoover et al. |
| 2010/0070714 A1 | 3/2010 | Hoover et al. |
| 2012/0203971 A1 | 8/2012 | Hoover et al. |
| 2012/0209944 A1 | 8/2012 | Mejdrich et al. |
| 2012/0215988 A1 | 8/2012 | Kriegel et al. |

FOREIGN PATENT DOCUMENTS

| | | |
|---|---|---|
| JP | 05225153 | 9/1993 |
| JP | 07311750 | 11/1995 |
| JP | 018185380 | 7/1996 |
| JP | 10232788 | 9/1998 |
| JP | 10240707 | 9/1998 |
| JP | 2005018620 | 1/2005 |
| JP | 2005513610 | 5/2005 |
| JP | 2005513611 | 5/2005 |
| JP | 2005521124 | 7/2005 |
| JP | 2006515690 | 6/2006 |
| JP | 2009110512 | 5/2009 |
| WO | WO/2007010461 | 1/2007 |

OTHER PUBLICATIONS

Notice of Allowance, U.S. Appl. No. 11/972,753, Sep. 28, 2012.
Office Action, U.S. Appl. No. 12/031,738, Aug. 20, 2012.
Office Action, U.S. Appl. No. 12/118,059, Aug. 14, 2012.
Notice of Allowance, U.S. Appl. No. 11/945,396, Oct. 23, 2012.
Notice of Allowance, U.S. Appl. No. 12/118,017, Oct. 30, 2012.
Notice of Allowance, U.S. Appl. No. 12/113,286, Dec. 12, 2012.
Office Action Dated Jan. 29, 2010 in U.S. Appl. No. 11/945,396.
Final Office Action Dated Jan. 15, 2010 in U.S. Appl. No. 12/031,733.
Gupta et al., "Synthesis and Simulation of Digital Systems Containing Interacting Hardware and Software Componenets", 29$^{th}$ ACM/IEEE Design Automatic Conference, 1992, pp. 225-230.
Luca Benini et al., "Network on Chips: A New SoC Paradigm", Computer IEEE, Jan. 2002, vol. 35, Issue 1, pp. 7-78.
Yutaka Yamada et al., "Analysis about Topologies of Network on Chip", IPSJ SIG Technical Report, Information Processing of Japan, vol. 2004, No. 123, pp. 35-40.
Office Action, U.S. Appl. No. 11/936,873, Apr. 22, 2013.
Office Action, U.S. Appl. No. 12/102,033, Jun. 6, 2013.
Office Action, U.S. Appl. No. 13/440,589, May 23, 2013.
Final Office Action, U.S. Appl. No. 13/461,913, Jun. 4, 2013.
Office Action, U.S. Appl. No. 13/778,862, Jun. 14, 2013.
U.S. Appl. No. 12/117,897, filed May 9, 2008, Hoover, et al.
U.S. Appl. No. 12/031,733, filed Feb. 15, 2008, Hoover, et al.
U.S. Appl. No. 12/108,846, filed Apr. 24, 2008, Kuesel, et al.
U.S. Appl. No. 12/108,770, filed Apr. 24, 2008, Mejdrich, et al.
U.S. Appl. No. 12/029,647, filed Feb. 12, 2008, Hoover, et al.
U.S. Appl. No. 12/118,017, filed May 9, 2008, Comparan, et al.
U.S. Appl. No. 12/118,059, filed May 9, 2008, Mejdrich, et al.
U.S. Appl. No. 12/117,875, filed May 9, 2008, Hoover, et al.
U.S. Appl. No. 12/121,222, filed May 15, 2008, Kriegel, et al.
U.S. Appl. No. 11/936,873, filed Nov. 8, 2007, Hoover, et al.
U.S. Appl. No. 12/135,364, filed Jun. 9, 2008, Hoover, et al.
U.S. Appl. No. 11/937,579, filed Nov. 9, 2007, Mejdrich, et al.
U.S. Appl. No. 12/102,033, filed Apr. 14, 2008, Heil, et al.
U.S. Appl. No. 12/118,272, filed May 9, 2008, Kuesel, et al.
U.S. Appl. No. 12/118,039, filed May 9, 2008, Hoover, et al.
U.S. Appl. No. 11/945,396, filed Nov. 27, 2007, Hoover, et al.
U.S. Appl. No. 12/015,975, filed Jan. 17, 2008, Comparan, et al.
U.S. Appl. No. 12/117,906, filed May 9, 2008, Hoover, et al.
U.S. Appl. No. 12/233,180, filed Sep. 18, 2008, Hoover, et al.
U.S. Appl. No. 12/113,286, filed May 1, 2008, Heil, et al.
U.S. Appl. No. 11/955,553, filed Dec. 13, 2007, Comparan, et al.
U.S. Appl. No. 12/031,738, filed Feb. 15, 2008, Hoover, et al.
U.S. Appl. No. 11/972,753, filed Jan. 11, 2008, Mejdrich, et al.
U.S. Appl. No. 12/060,559, filed Apr. 1, 2008, Comparan, et al.
U.S. Appl. No. 11/926,212, filed Oct. 29, 2007, Hoover, et al.
U.S. Appl. No. 12/118,298, filed May 9, 2008, Heil, et al.
U.S. Appl. No. 12/118,315, filed May 9, 2008, Mejdrich, et al.
U.S. Appl. No. 11/938,376, filed Nov. 12, 2007, Mejdrich, et al.
U.S. Appl. No. 12/121,168, filed May 15, 2008, Hoover, et al.
Office Action Dated Jul. 20, 2009 in U.S. Appl. No. 12/031,733.
Kuskin, et al.; The Stanford Flash Multiprocessor; Jun. 6, 1996; Stanford University.
Kumar et al., "A Network on Chip Architecture and Design Methodology," 2002, IEEE, 8 pages.
Notice of Allowance, U.S. Appl. No. 12/031,738, Mar. 12, 2013.
Notice of Allowance, U.S. Appl. No. 12/118,059, Mar. 21, 2013.
Office Action, U.S. Appl. No. 13/445,005, Dec. 14, 2012.
Office Action, U.S. Appl. No. 13/461,913, Jan. 24, 2013.
U.S. Appl. No. 13/778,862, Feb. 27, 2013.
Master Dissertation, University of Electronic Science and Technology of China, 2007, pp. 0-35 and pp. 36-81 (includes English abstract).
Wikipedia, "Parallel Computing", Wikipedia [online], URL: http://en.wikipedia.org/wiki/Parallel_computing, Jan. 19, 2007, pp. 1-6, USA.
Pande et al., "Performance Evaluation and Design Trade-Offs for Network-on-Chip Interconnect Architectures", IEEE Transactions on Computers, vol. 54, No. 8, Aug. 2005, pp. 1025-1040, IEEE Computer Society, USA.
Samman et al., "Networks-On-Chip Based on Dynamic Wormhole Packet Identity Mapping Management", VLSI Design, Aug. 7, 2008, 15 pp., vol. 2009, Article ID 941701, Hindawi Publishing Corporation, USA.
Mereu, "Conception, Analysis, Design and Realization of a Multi-socket Network-on-Chip Architecture and of the Binary Translation support for VLIW core targeted to Systems-on-Chip", Mar. 2007, 145 pages, accessible at http://www.diee.unica.it/driei/tesi/19_mereu.pdf.
Radulescu et al., "An Efficient On-Chip Network Interface Offering Guaranteed Services, Shared-Memory Abstraction, and Flexible Network Configuration", from Proceedings of the Design, Automation and Test in Europe Conference and Exhibition (Date'04), held in Paris, France Feb. 2004, pp. 878-883, vol. 2, IEEE Computer Society, USA.
Kavaldjiev, et al., "Providing QoS Guarantees in a NoC by Virtual Channel Reservation", In Proc. of Int. Workshop on Applied and Reconfigurable Computing (ARC), Mar. 2006, pp. 1-12.
Taylor et al., "System on Chip Packet Processor for an Experimental Network Service Platform", Global Telecommunications Conference (Globecom'03), Dec. 2003, pp. 3933-3937, vol. 7, IEEE Xplore Digital Library (online), DOI: 10.1109/GLOCOM.2003.1258967.
Intel, "Intel® E8870 System Chipset: The Cost-Effective Solution for Scalable Servers", Jun. 2002, pp. 1-10, Intel, USA.
Bolotin et al., "The Power of Priority: NoC based Distributed Cache Coherency", 1$^{st}$ International Symposium on Networks-on-Chip (NOCS'07), May 21, 2007, pp. 117-126, IEEE Xplore Digital Library (online), DOI: 10.1109/NOCS.2007.42.
Virtanen et al., "NoC Interface for a Protocol Processor", IEEE Norchip Nov. 2003, pp. 1-104, University of Turku, Finland.

(56) References Cited

OTHER PUBLICATIONS

Walter et al., "BENoC: A Bus-Enhanced Network on-Chip", Center for Communication and Information Technologies (CCIT) Report, Dec. 2007, pp. 1-109, Technion, Israel Institute of Technology, Haifa, Israel.

Furber et al., "Future Trends in SOC Interconnect", Proceedings of the International Symposium on System-On-Chip (SoC), IEEE Computer Society, Aug. 2000, USA.

Huneycutt, et al., "Software Caching using Dynamic Binary Rewriting for Embedded Devices", Sep. 2001, Proceedings of the International Conference on Parallel Processing, 10 pages.

Cifuentes, et al., "Walkabout—A Retargetable Dynamic Binary Translation Framework", Sun Microsystems Laboratories, Jan. 2002, 13 pages.

Issenin et al.; Data Reuse Driven Memory and Network-on-Chip Co-Synthesis. In Proceedings of International Embedded Systems Symposium ( IESS), May 30-Jun. 1, 2007.

Monchiero, et al, "Exploration of Distributed Shared Memory Architectures for NoC-based Microprocessors", Journal of Systems Architecture, vol. 53, Issue 10, Oct. 2007, pp. 1-8.

Al-Hashimi; "System-on-Chip—Next Generation Electronics", May 2006, Chapter 18 ("AsynchronoUS-on-chip networks"), pp. 1-32, The Institution of Electrical Engineers (IEE Press).

Nollet et al., "Centralized Run-Time Resource Management in a Network-on-Chip Containing Reconfigurable Hardware Tiles" [online]. [retrieved Jul. 15, 2011], 6 pages, retrieved from Internet: http://portal.acm.org/ft_gateway.cfm?id=1049106&type=pdf&CFID=32720390&CFTOKEN=986277114.

Kavaldjiev, "A Run-Time Reconfigurable Network-on-Chip for Streaming DSP Applications", University of Twente [online], Jan. 2007 [retrieved Feb. 6, 2014], Retrieved from Internet: <URL: http://eprints.eemcs.utwente.nl/9192/01/thesis_print.pdf>, whole document.

Office Action, U.S. Appl. No. 11/936,873, Feb. 12, 2014.

Office Action, U.S. Appl. No. 12/102,033, Sep. 25, 2013.

\* cited by examiner

SOFTWARE PIPELINING ON A NETWORK ON CHIP

CROSS-REFERENCE TO RELATED APPLICATION

This application is a continuation application of and claims priority from U.S. patent application Ser. No. 11/938,376, filed on Nov. 12, 2007.

BACKGROUND OF THE INVENTION

1. Field of the Invention

The field of the invention is data processing, or, more specifically apparatus and methods for data processing with a network on chip ('NOC').

2. Description of Related Art

There are two widely used paradigms of data processing; multiple instructions, multiple data ('MIMD') and single instruction, multiple data ('SIMD'). In MIMD processing, a computer program is typically characterized as one or more threads of execution operating more or less independently, each requiring fast random access to large quantities of shared memory. MIMD is a data processing paradigm optimized for the particular classes of programs that fit it, including, for example, word processors, spreadsheets, database managers, many forms of telecommunications such as browsers, for example, and so on.

SIMD is characterized by a single program running simultaneously in parallel on many processors, each instance of the program operating in the same way but on separate items of data. SIMD is a data processing paradigm that is optimized for the particular classes of applications that fit it, including, for example, many forms of digital signal processing, vector processing, and so on.

There is another class of applications, however, including many real-world simulation programs, for example, for which neither pure SIMD nor pure MIMD data processing is optimized. That class of applications includes applications that benefit from parallel processing and also require fast random access to shared memory. For that class of programs, a pure MIMD system will not provide a high degree of parallelism and a pure SIMD system will not provide fast random access to main memory stores.

SUMMARY OF THE INVENTION

Methods, apparatus, and computer program products for a network on chip ('NOC') that shares memory in a software pipeline and includes integrated processor ('IP') blocks, routers, memory communications controllers, and network interface controllers, with each IP block adapted to a router through a memory communications controller and a network interface controller, where each memory communications controller controlling communications between an IP block and memory, and each network interface controller controlling inter-IP block communications through routers, including segmenting a computer software application into stages of a software pipeline, the software pipeline comprising one or more paths of execution, each stage comprising a flexibly configurable module of computer program instructions identified by a stage ID, each stage executing in a thread of execution on an IP block; allocating, by at least one of the stages, memory to be shared among at least two stages including creating a smart pointer, the smart pointer including data elements for determining when the shared memory can be deallocated; determining, by at least one stage in dependence upon the data elements for determining when the shared memory can be deallocated, that the shared memory can be deallocated; and deallocating the shared memory.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
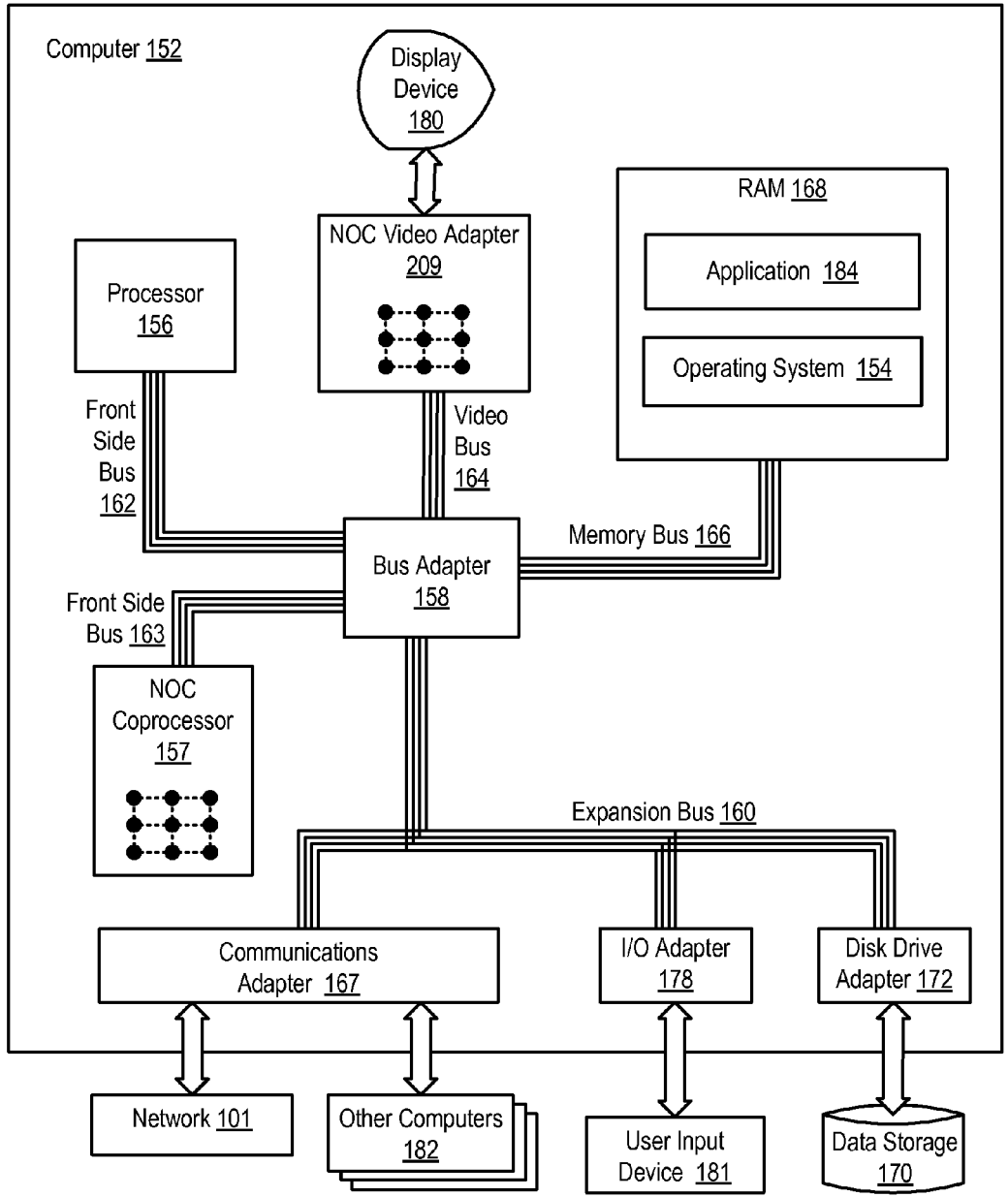
FIG. 1 sets forth a block diagram of automated computing machinery comprising an exemplary computer useful in data processing with a NOC according to embodiments of the present invention.

Exemplary apparatus and methods for data processing with a NOC in accordance with the present invention are described with reference to the accompanying drawings, beginning with FIG. 1. FIG. 1 sets forth a block diagram of automated computing machinery comprising an exemplary computer (152) useful in data processing with a NOC according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application program (184), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful data processing with a NOC according to embodiments of the present invention include UNIX™ Linux™ Microsoft XP™, AIX™ IBM's i5/OS™ and others as will occur to those of skill in the art. The operating system (154) and the application (184) in the example of FIG. 1 are shown in RAM (168), but many components of such software typically are stored in non-volatile memory also, such as, for example, on a disk drive (170).

The example computer (152) includes two example NOCs according to embodiments of the present invention: a video adapter (209) and a coprocessor (157). The video adapter (209) is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example NOC coprocessor (157) is connected to processor (156) through bus adapter (158), and front side buses (162 and 163), which is also a high speed bus. The NOC coprocessor of FIG. 1 is optimized to accelerate particular data processing tasks at the behest of the main processor (156).

The example NOC video adapter (209) and NOC coprocessor (157) of FIG. 1 each include a NOC according to embodiments of the present invention, including integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. The NOC video adapter and the NOC coprocessor are optimized for programs that use parallel processing and also require fast random access to shared memory. The details of the NOC structure and operation are discussed below with reference to FIGS. 2-4.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for data processing with a NOC according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing with a NOC according to embodiments of the present invention include modems for wired dial-up communications, Ethernet (IEEE 802.3) adapters for wired data communications network communications, and 802.11 adapters for wireless data communications network communications.

Figure 2:
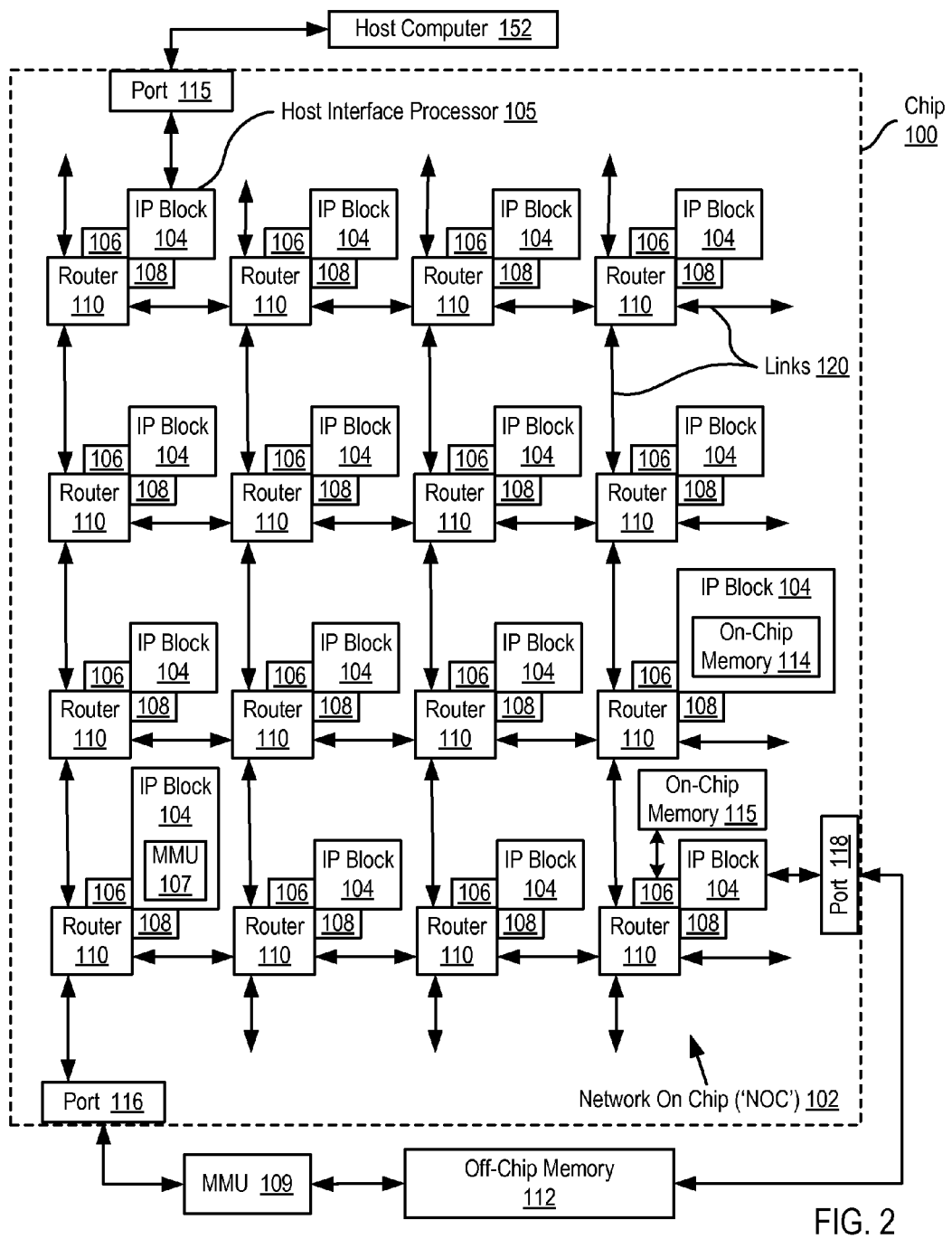
FIG. 2 sets forth a functional block diagram of an example NOC according to embodiments of the present invention.

For further explanation, FIG. 2 sets forth a functional block diagram of an example NOC (102) according to embodiments of the present invention. The NOC in the example of FIG. 1 is implemented on a 'chip' (100), that is, on an integrated circuit. The NOC (102) of FIG. 2 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semi-conductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well.

Each IP block (104) in the example of FIG. 2 is adapted to a router (110) through a memory communications controller (106). Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each IP block (104) in the example of FIG. 2 is also adapted to a router (110) through a network interface controller (108). Each network interface controller (108) controls communications through routers (110) between IP blocks (104). Examples of communications between IP blocks include messages carrying data and instructions for processing the data among IP blocks in parallel applications and in pipelined applications. The network interface controllers (108) are described in more detail below with reference to FIG. 3.

Each IP block (104) in the example of FIG. 2 is adapted to a router (110). The routers (110) and links (120) among the routers implement the network operations of the NOC. The links (120) are packets structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wise, 512 wires. In addition, each link is bi-directional, so that if the link packet structure includes 64 bytes, the wire bus actually contains 1024 wires between each router and each of its neighbors in the network. A message can includes more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller (106) in the example of FIG. 2 controls communications between an IP block and memory. Memory can include off-chip main RAM (112), memory (115) connected directly to an IP block through a memory communications controller (106), on-chip memory enabled as an IP block (114), and on-chip caches. In the NOC of FIG. 2, either of the on-chip memories (114, 115), for example, may be implemented as on-chip cache memory. All these forms of memory can be disposed in the same address space, physical addresses or virtual addresses, true even for the memory attached directly to an IP block. Memory-addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communication controller can be addressed by the IP block that is adapted to the network by that memory communication controller—and can also be addressed from any other IP block anywhere in the NOC.

The example NOC includes two memory management units ('MMUs') (107, 109), illustrating two alternative memory architectures for NOCs according to embodiments of the present invention. MMU (107) is implemented with an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU means that all processors in all IP blocks of the NOC can operate in virtual memory address space, with all conversions to physical addresses of the off-chip memory handled by the off-chip MMU (109).

In addition to the two memory architectures illustrated by use of the MMUs (107, 109), data communications port (118) illustrates a third memory architecture useful in NOCs according to embodiments of the present invention. Port (118) provides a direct connection between an IP block (104) of the NOC (102) and off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer. A NOC may, for example, implement a video graphics adapter (209) or a coprocessor (157) on a larger computer (152) as described above with reference to FIG. 1. In the example of FIG. 2, the host interface processor (105) is connected to the larger host computer through a data communications port (115). The port (115) includes the pins and other interconnections required to conduct signals between the NOC and the host computer, as well as sufficient intelligence to convert message packets from the NOC to the bus format required by the host computer (152). In the example of the NOC coprocessor in the computer of FIG. 1, such a port would provide data communications format translation between the link structure of the NOC coprocessor (157) and the protocol required for the front side bus (163) between the NOC coprocessor (157) and the bus adapter (158).

Figure 3:
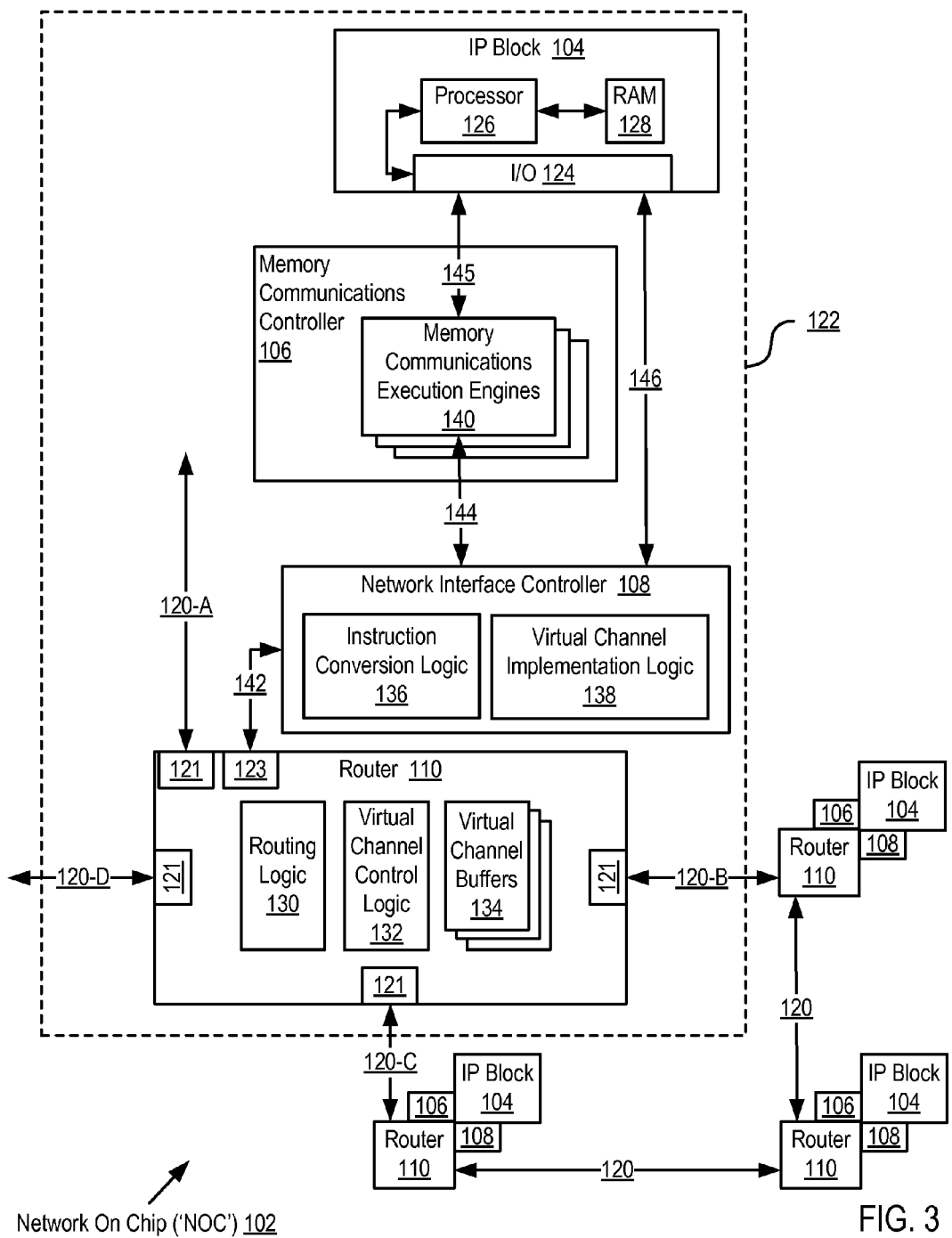
FIG. 3 sets forth a functional block diagram of a further example NOC according to embodiments of the present invention.

For further explanation, FIG. 3 sets forth a functional block diagram of a further example NOC according to embodiments of the present invention. The example NOC of FIG. 3 is similar to the example NOC of FIG. 2 in that the example NOC of FIG. 3 is implemented on a chip (100 on FIG. 2), and the NOC (102) of FIG. 3 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). In the example of FIG. 3, one set (122) of an IP block (104) adapted to a router (110) through a memory communications controller (106) and network interface controller (108) is expanded to aid a more detailed explanation of their structure and operations. All the IP blocks, memory communications controllers, network interface controllers, and routers in the example of FIG. 3 are configured in the same manner as the expanded set (122).

In the example of FIG. 3, each IP block (104) includes a computer processor (126) and I/O functionality (124). In this example, computer memory is represented by a segment of random access memory ('RAM') (128) in each IP block (104). The memory, as described above with reference to the example of FIG. 2, can occupy segments of a physical address space whose contents on each IP block are addressable and accessible from any IP block in the NOC. The processors (126), I/O capabilities (124), and memory (128) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (142, 144, 145) between the network and the IP block (104). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each network interface controller (108) is enabled to convert communications instructions from command format to network packet format for transmission among the IP blocks (104) through routers (110). The communications instructions are formulated in command format by the IP block (104) or by the memory communications controller (106) and provided to the network interface controller (108) in command format. The command format is a native format that conforms to architectural register files of the IP block (104) and the memory communications controller (106). The network packet format is the format required for transmission through routers (110) of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC (102) of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (136) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller (106) is naturally also the network location of that memory communication controller's associated router (110), network interface controller (108), and IP block (104). The instruction conversion logic (136) within each network interface controller is capable of converting memory addresses to network addresses for purposes of transmitting memory-address-based communications through routers of a NOC.

Upon receiving message traffic from routers (110) of the network, each network interface controller (108) inspects each packet for memory instructions. Each packet containing a memory instruction is handed to the memory communications controller (106) associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In the NOC (102) of FIG. 3, each IP block (104) is enabled to bypass its memory communications controller (106) and send inter-IP block, network-addressed communications (146) directly to the network through the IP block's network interface controller (108). Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through it I/O functions (124) directly to the IP block's network interface controller in command format, then converted to packet format by the network interface controller and transmitted through routers of the NOC to another IP block. Such network-addressed communications (146) are bi-directional, potentially proceeding to and from each IP block of the NOC, depending on their use in any particular application. Each network interface controller, however, is enabled to both send and receive (142) such communications to and from an associated router, and each network interface controller is enabled to both send and receive (146) such communications directly to and from an associated IP block, bypassing an associated memory communications controller (106).

Each network interface controller (108) in the example of FIG. 3 is also enabled to implement virtual channels on the network, characterizing network packets by type. Each network interface controller (108) includes virtual channel implementation logic (138) that classifies each communication instruction by type and records the type of instruction in a field of the network packet format before handing off the instruction in packet form to a router (110) for transmission on the NOC. Examples of communication instruction types include inter-IP block network-address-based messages, request messages, responses to request messages, invalidate messages directed to caches; memory load and store messages; and responses to memory load messages, and so on.

Each router (110) in the example of FIG. 3 includes routing logic (130), virtual channel control logic (132), and virtual channel buffers (134). The routing logic typically is implemented as a network of synchronous and asynchronous logic that implements a data communications protocol stack for data communication in the network formed by the routers (110), links (120), and bus wires among the routers. The routing logic (130) includes the functionality that readers of skill in the art might associate with off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports (121) connected through bus wires (120-A, 120-B, 120-C, 120-D) to other routers and a fifth port (123) connecting each router to its associated IP block (104) through a network interface controller (108) and a memory communications controller (106).

In describing memory-address-based communications above, each memory address was described as mapped by network interface controllers to a network address, a network location of a memory communications controller. The network location of a memory communication controller (106) is naturally also the network location of that memory communication controller's associated router (110), network interface controller (108), and IP block (104). In inter-IP block, or network-address-based communications, therefore, it is also typical for application-level data processing to view network addresses as location of IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x,y coordinates of each such set in the mesh.

In the NOC (102) of FIG. 3, each router (110) implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router (110) in the example of FIG. 3 also includes virtual channel control logic (132) and virtual channel buffers (134). The virtual channel control logic (132) examines each received packet for its assigned communications type and places each packet in an outgoing virtual channel buffer for that communications type for transmission through a port to a neighboring router on the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller (108). Each network interface controller is configured to, upon receipt of such a signal, refuse to accept, from its associated memory communications controller (106) or from its associated IP block (104), communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 3. When a router encounters a situation in which a packet might be dropped in some unreliable protocol such as, for example, the Internet Protocol, the routers in the example of FIG. 3 suspend by their virtual channel buffers (134) and their virtual channel control logic (132) all transmissions of packets in a virtual channel until buffer space is again available, eliminating any need to drop packets. The NOC of FIG. 3, therefore, implements highly reliable network communications protocols with an extremely thin layer of hardware.

Figure 4:
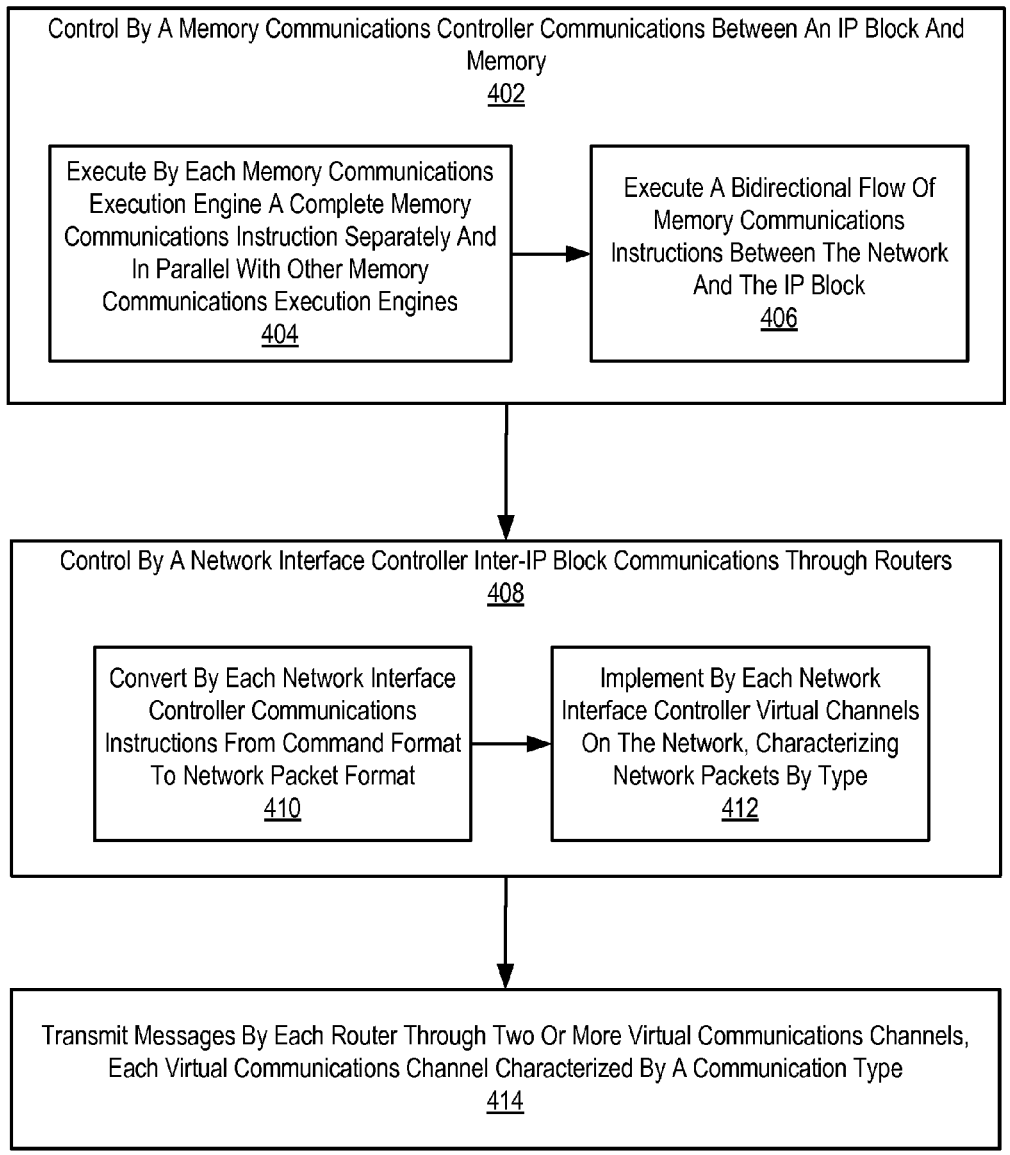
FIG. 4 sets forth a flow chart illustrating an exemplary method for data processing with a NOC according to embodiments of the present invention.

For further explanation, FIG. 4 sets forth a flow chart illustrating an exemplary method for data processing with a NOC according to embodiments of the present invention. The method of FIG. 4 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 4, each IP block may be implemented as a reusable unit of synchronous or asynchronous logic design used as a building block for data processing within the NOC.

The method of FIG. 4 includes controlling (402) by a memory communications controller (106 on FIG. 3) communications between an IP block and memory. In the method of FIG. 4, the memory communications controller includes a plurality of memory communications execution engines (140 on FIG. 3). Also in the method of FIG. 4, controlling (402) communications between an IP block and memory is carried out by executing (404) by each memory communications execution engine a complete memory communications instruction separately and in parallel with other memory communications execution engines and executing (406) a bidirectional flow of memory communications instructions between the network and the IP block. In the method of FIG. 4, memory communications instructions may include translation lookaside buffer control instructions, cache control instructions, barrier instructions, memory load instructions, and memory store instructions. In the method of FIG. 4, memory may include off-chip main RAM, memory connected directly to an IP block through a memory communications controller, on-chip memory enabled as an IP block, and on-chip caches.

The method of FIG. 4 also includes controlling (408) by a network interface controller (108 on FIG. 3) inter-IP block communications through routers. In the method of FIG. 4, controlling (408) inter-IP block communications also includes converting (410) by each network interface controller communications instructions from command format to network packet format and implementing (412) by each network interface controller virtual channels on the network, including characterizing network packets by type.

The method of FIG. 4 also includes transmitting (414) messages by each router (110 on FIG. 3) through two or more virtual communications channels, where each virtual communications channel is characterized by a communication type. Communication instruction types, and therefore virtual channel types, include, for example: inter-IP block network-address-based messages, request messages, responses to request messages, invalidate messages directed to caches; memory load and store messages; and responses to memory load messages, and so on. In support of virtual channels, each router also includes virtual channel control logic (132 on FIG. 3) and virtual channel buffers (134 on FIG. 3). The virtual channel control logic examines each received packet for its assigned communications type and places each packet in an outgoing virtual channel buffer for that communications type for transmission through a port to a neighboring router on the NOC.

On a NOC according to embodiments of the present invention, computer software applications may be implemented as software pipelines. For further explanation, FIG. 5 sets forth a data flow diagram illustrating operation of an example pipeline (600). The example pipeline (600) of FIG. 5 includes three stages (602, 604, 606) of execution. A software pipeline is a computer software application that is segmented into a set of modules or 'stages' of computer program instructions that cooperate with one another to carry out a series of data processing tasks in sequence. Each stage in a pipeline is composed of a flexibly configurable module of computer program instructions identified by a stage ID with each stage executing on a thread of execution on an IP block on a NOC (102). The stages are 'flexibly configurable' in that each stage may support multiple instances of the stage, so that a pipeline may be scaled by instantiating additional instances of a stage as needed depending on workload.

Figure 5:
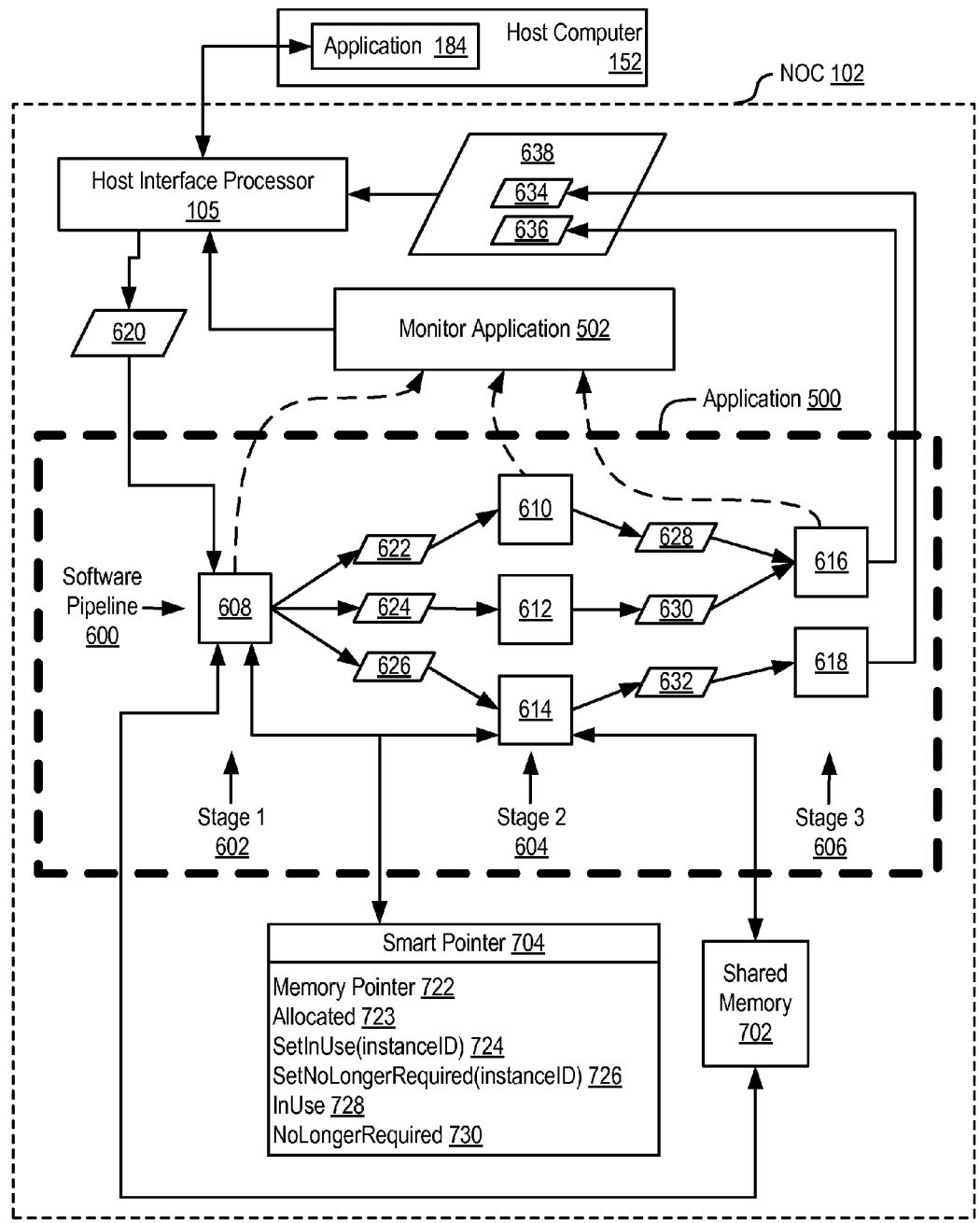
FIG. 5 sets forth a data flow diagram an example software pipeline on a NOC according to embodiments of the present invention, where the NOC is capable of sharing memory in a software pipeline.

Because each stage (602, 604, 606) is implemented by computer program instructions executing on an IP block (104 on FIG. 2) of a NOC (102 on FIG. 2), each stage (602, 604, 606) is capable of accessing addressed memory through a memory communications controller (106 on FIG. 2) of an IP block—with memory-addressed messages as described above. At least one stage, moreover, sends network-address based communications among other stages, where the network-address based communications maintain packet order. In the example of FIG. 5, both stage 1 and stage 2 send network-address based communications among stages, stage 1 sending network address based communications (622-626) from stage 1 to stage 2, stage 2 sending network addressed communications (628-632) to stage 3.

The network-address based communications (622-632) in the example of FIG. 5 maintain packet order. Network-address based communications among stages of a pipeline are all communications of a same type which therefore flow through the same virtual channel as described above. Each packet in such communications is routed by a router (110 on FIG. 3) according to embodiments of the present invention, entering and leaving a virtual channel buffer (134 on FIG. 3) in sequence, in FIFO order, first-in, first-out, thereby maintaining strict packet order. Maintaining packet order in network address based communications according to the present invention provides message integrity because the packets are received in the same order in which they are—eliminating the need for tracking packet sequence in a higher layer of the data communication protocol stack. Contrast the example of TCP/IP where the network protocol, that is, the Internet Protocol, not only makes no undertaking regarding packet sequence, but in fact normally does deliver packets out of order, leaving it up to the Transmission Control Protocol in a higher layer of the data communication protocol stack to put the packets in correct order and deliver a complete message to the application layer of the protocol stack.

Each stage implements a producer/consumer relationship with a next stage. Stage 1 receives work instructions and work piece data (620) through a host interface processor (105) from an application (184) running on a host computer (152). Stage 1 carries out its designated data processing tasks on the work piece, produces output data, and sends the produced output data (622, 624, 626) to stage 2, which consumes the produced output data from stage 1 by carrying out its designated data processing tasks on the produced output data from stage 1, thereby producing output data from stage 2, and sends its produced output data (628, 630, 632) to stage 3, which in turn consumes the produced output data from stage 2 by carrying out its designated data processing tasks on the produced output data from stage 2, thereby producing output data from stage 3, which then stores its produced output data (634, 636) in an output data structure (638) for eventual return through the host interface processor (105) to the originating application program (184) on the host computer (152).

The return to the originating application program is said to be 'eventual' because quite a lot of return data may need to be calculated before the output data structure (638) is ready to return. The pipeline (600) in this example is represented with only six instances (622-632) in three stages (602-606). Many pipelines according to embodiments of the present invention, however, may includes many stages and many instances of stages. In an atomic process modeling application, for example, the output data structure (638) may represent the state at a particular nanosecond of an atomic process containing the exact quantum state of billions of sub-atomic particles, each of which requires thousands of calculations in various stages of a pipeline. Or in a video processing application, for a further example, the output data structure (638) may represent a video frame composed of the current display state of thousands of pixels, each of which requires many calculations in various stages of a pipeline.

Each instance (622-632) of each stage (602-606) of the pipeline (600) is implemented as an application-level module of computer program instructions executed on a separate IP block (104 on FIG. 2) on a NOC (102 on FIG. 2). Each stage is assigned to a thread of execution on an IP block of a NOC. Each stage is assigned a stage ID, and each instance of a stage is assigned an identifier. The pipeline (600) is implemented in this example with one instance (608) of stage 1, three instances (610, 612, 614) of stage 2, and two instances (616, 618) of stage 3. Stage 1 (602, 608) is configured at start-up by the host interface processor (105) with the number of instances of stage 2 and the network location of each instance of stage 2. Stage 1 (602, 608) may distribute its resultant workload (622, 624, 626) by, for example, distributing it equally among the instances (610-614) of stage 2. Each instance (610-614) of stage 2 is configured at start up with the network location of each instance of stage 3 to which an instance of stage 2 is authorized to send its resultant workload. In this example, instances (610, 612) are both configured to send their resultant workloads (628, 630) to instance (616) of stage 3, whereas only one instance (614) of stage 2 sends work (632) to instance (618) of stage 3. If instance (616) becomes a bottleneck trying to do twice the workload of instance (618), an additional instance of stage 3 may be instantiated, even in real time at run time if needed.

In the example of FIG. 5, where a computer software application (500) is segmented into stages (602-606), each stage may be configured with a stage ID for each instance of a next stage. That a stage may be configured with a stage ID means that a stage is provided with an identifier for each instance of a next stage, with the identifier stored in memory available to the stage. Configuring with identifiers of instances of next stage can include configuring with the number of instances of a next states as well as the network location of each instance of a next stage, as mentioned above. The single instance (608) of stage 1, in the current example, may be configured with a stage identifier or 'ID' for each instance (610-614) of a next stage, where the 'next stage' for stage 1, of course, is stage 2. The three instances (610-614) of stage 2 each may be configured with a stage ID for each instance (616, 618) of a next stage, where the next stage for stage 2 naturally is stage 3. And so on, with stage 3 in this example representing the trivial case of a stage having no next stage, so that configuring such a stage with nothing represents configuring that stage with the stage ID of a next stage.

Configuring a stage with IDs for instances of a next stage as described here provides the stage with the information needed to carry out load balancing across stages. In the pipeline of FIG. 5, for example, where a computer software application (500) is segmented into stages, the stages are load balanced with a number of instances of each stage in dependence upon the performance of the stages. Such load balancing can be carried out, for example, by monitoring the performance of the stages and instantiating a number of instances of each stage in dependence upon the performance of one or more of the stages. Monitoring the performance of the stages can be carried out by configuring each stage to report performance statistics to a monitoring application (502) that in turn is installed and running on another thread of execution on an IP block or host interface processor. Performance statistics can include, for example, time required to complete a data processing task, a number of data processing tasks completed within a particular time period, and so on, as will occur to those of skill in the art.

Instantiating a number of instances of each stage in dependence upon the performance of one or more of the stages can be carried out by instantiating, by a host interface processor (105), a new instance of a stage when monitored performance indicates a need for a new instance. As mentioned, instances (610, 612) in this example are both configured to send their resultant workloads (628, 630) to instance (616) of stage 3, whereas only one instance (614) of stage 2 sends work (632) to instance (618) of stage 3. If instance (616) becomes a bottleneck trying to do twice the workload of instance (618), an additional instance of stage 3 may be instantiated, even in real time at run time if needed.

The NOC of FIG. 5 is capable of sharing memory in a software pipeline, that is, sharing memory among stages of a software pipeline. The example NOC (102) of FIG. 5 includes memory (702) allocated by at least one of the stages (602-606) to be shared among at least two stages. In this example, an instance of stage 1 (608) allocated the shared memory, and the shared memory is shared between stages 1 and 2 (602, 604).

The example NOC also includes a smart pointer (704), which in turn includes data elements (728, 730) for determining when the shared memory (702) can be deallocated. The smart pointer (704) is a 'pointer' in the sense that it is implemented as a structure that contains a pointer (722) to a segment of memory (702) that is shared among stages in a software pipeline. The memory pointer (722) may be implemented, for example, as an address of the beginning of the shared memory segment, the beginning address plus an extent or size of the shared memory segment, both a beginning address and an ending address, and so on, as will occur to those of skill in the art. The smart pointer (704) is 'smart' in that it is implemented as an instance of an object-oriented class that includes accessor functions (724, 726) for setting the values of the data elements (728, 730) for determining when the shared memory (702) can be deallocated. The accessor functions are named respectively SetInUse( ) (724) and SetNoLongerRequired( ) (726). Each accessor function takes a call parameter, "instanceID," an identifier of an instance of a stage in a software pipeline. Each accessor function sets a value in a corresponding data element. SetInUse( ) (724) sets a value in an InUse (728) data element, and SetNoLongerRequired( ) (726) sets a value in a NoLongerRequired (730) data element. In many embodiments, more than one instance of a stage will have access to the same shared memory segment, so that a smart pointer will administer multiple sets of InUse and NoLongerRequired data elements for determining when the shared memory can be deallocated. Such embodiments can store multiple sets of InUse and NoLongerRequired data elements for determining when the shared memory can be deallocated in a table, for example. In such embodiments, the "instanceID" parameter may be used to specify which rows of the table contain InUse and NoLongerRequired data elements whose values are to be set by any particular call to an accessor function.

Just as a stage, or an instance of a stage, can allocate memory to be shared among stages, so also, in the example of FIG. 5, a stage can determine in dependence upon the data elements for determining when the shared memory can be deallocated that the shared memory can be deallocated, and such a stage, upon making the determination that shared memory can be deallocated, can deallocate the shared memory. In the example NOC of FIG. 5, the computer software application (500) segmented into stages (602-606) of a software pipeline (600) can include two or more stages authorized to change values of the data elements for determining when the shared memory can be deallocated. In this example, stages 1 and 2 are so authorized, because only instances of stages 1 and 2 are sharing the shared memory segment (702).

In the example NOC of FIG. 5, the computer software application (500) segmented into stages (602-606) of a software pipeline (600) can include a stage authorized to determine that the memory (702) can be deallocated. In this example, it is assumed that stage 1 (602) allocated the shared memory segment (702) and that stage 1 is authorized to determine that the shared memory can be deallocated.

A software pipeline typically includes one or more paths of execution. In the example of FIG. 5, the software pipeline includes three paths of execution among the stages of the pipeline. Represented as sequences of instances of the stage, the paths of execution in the software pipeline in the example of FIG. 5 are:

608-610-616
608-612-616
608-614-618

For ease of explanation, the example pipeline (600) here is represented with only three paths of execution among its stages. Readers will recognize, however, that many NOCs that share memory in a software pipeline according to embodiments of the present invention will implement many more stages, many instances of stages, and many paths of execution among the stages.

The data elements (728, 730) for determining when the shared memory can be deallocated can be implemented as a table that includes at least one row for each path of execution in the pipeline. Such a table can include, as data elements for determining when the shared memory can be deallocated, a column indicating that a segment of the shared memory is in use by a stage in a path of the pipeline and another column indicating that the segment of shared memory is no longer required for use by the stage in a path of execution in the pipeline. An example of such a table is set forth here as Table 1, and subsequent examples of the same table are set forth below as Tables 1a and 1b:

TABLE 1

Data Elements For Determining When A Particular Segment Of Shared Memory Can Be Deallocated

| Path | Instance | In Use (728) | No Longer Required (730) |
|---|---|---|---|
| 608-610-616 | 608 | 0 | 0 |
| 608-610-616 | 610 | 0 | 0 |
| 608-610-616 | 616 | 0 | 0 |
| 608-612-616 | 608 | 0 | 0 |
| 608-612-616 | 612 | 0 | 0 |
| 608-612-616 | 616 | 0 | 0 |
| 608-614-618 | 608 | 0 | 0 |
| 608-614-618 | 614 | 0 | 0 |
| 608-614-618 | 618 | 0 | 0 |

Table 1 includes three rows for each path of execution in the software pipeline of FIG. 5, one row for each instance of a stage in each path of execution. Table 1 includes a column entitled "In Use" (728) capable of indicating that a segment of the shared memory is in use by a stage in a path of the pipeline and another column entitled "No Longer Required" (730) capable of indicating that the segment of shared memory is no longer required for use by the stage in a path of execution in the pipeline. So providing separate In Use and No Longer Required fields for each instance of a stage that shares a memory segment means that each call to an accessor function from an instance of a stage of a software pipeline affects only a single, separate data element, thereby eliminating race conditions and either reducing or eliminating completely any need for mutual exclusion, memory locks, semaphores, and the like, to control access to data elements used for determining that shared memory can be deallocated.

In a NOC according to embodiments of the present invention, one of the stages of pipeline typically is designated as responsible for determining, in dependence upon data values in the columns of the table, that the memory can be deallocated. In the example NOC of FIG. 5, stage 1 (602), instance (608), in the software pipeline (600) is considered to be designated as responsible for determining that the shared memory segment can be deallocated. A preferred method of making such a determination is for the accessor functions (724, 726) to set the same value in both columns of the table representing data elements (728, 730) for determining when the shared memory can be deallocated. In this way, a stage that is designated responsible for determining that the memory can be deallocated can make that determination when the data values in the data elements for determining when the shared memory can be deallocated in each row of the table are equal.

It would make no difference whether the data values are numerical or Boolean as long as the operations on each column are symmetric. The values being equal in each row will demonstrate that the shared memory can be deallocated. Consider for further explanation, an example in which the accessor functions use the numeric values 0 and 1 to indicate whether a stage or an instance of a stage is using or no longer requires use of a shared memory segment. In such an example, the In Use and the No Longer Required columns can be initialized entirely to 0 when a smart pointer for a particular segment of shared memory is first instantiated. Table 1 shows an example of an initial state of values in data elements (728, 730) of a smart pointer for the memory (702) shared among stages of the software pipeline in the example of FIG. 5. That values of In Use (728) and No Longer Required (730) are the same in all rows of Table 1, indicating to a responsible or authorized stage that the shared memory segment administered by these data elements can be deallocated. If the segment were deallocated now, before any of the stages authorized to share it indicated usage, such a deallocation can be indicated in a member variable established for that purpose and named, for example, "Allocated" (723). Then the accessor function SetInUse( ) can be programmed to check the value of the Allocated (723) variable and, if the value of Allocated indicates deallocation, return an error code to any calling instance of a stage attempting to register an indication of usage.

Instances of stages indicate their current use of the shared memory by calling SetInUse(instanceID), thereby setting the value 1 in a row of the table corresponding to the calling instance. Table 1a show the state of such a table after a number of calls to the SetInUse(instanceID) accessor function.

TABLE 1a

Data Elements For Determining When A Particular Segment Of Shared Memory Can Be Deallocated

| Path | Instance | In Use (728) | No Longer Required (730) |
|---|---|---|---|
| 608-610-616 | 608 | 1 | 0 |
| 608-610-616 | 610 | 0 | 0 |
| 608-610-616 | 616 | 0 | 0 |
| 608-612-616 | 608 | 1 | 0 |

TABLE 1a-continued

Data Elements For Determining When A Particular
Segment Of Shared Memory Can Be Deallocated

| Path | Instance | In Use (728) | No Longer Required (730) |
| --- | --- | --- | --- |
| 608-612-616 | 612 | 0 | 0 |
| 608-612-616 | 616 | 0 | 0 |
| 608-614-618 | 608 | 1 | 0 |
| 608-614-618 | 614 | 1 | 0 |
| 608-614-618 | 618 | 0 | 0 |

In Table 1a, the values of In Use (728) have been set to 1 for instances (608) and (614), indicating that the shared memory segment is in use by instances of stages 1 and 2 in the pipeline of FIG. 5. Now the values of In Use (728) and No Longer Required (730) in four rows of the table are no longer equal. The values of In Use (728) are 1 for instances (608) and (614) and the corresponding values of No Longer Required (730) in the same rows are still set to 0. That the values of In Use (728) and No Longer Required (730) are not the same in all rows of Table 1a indicates to a responsible or authorized stage that the shared memory segment administered by these data elements can not be deallocated at this time—because the shared memory segment (702) administered by use of the data elements in Table 1a is in use and continues to be required by one or more instances (608, 614) of stages (602, 604) in at least one path of execution (608-614-618) in the software pipeline (600) of FIG. 5.

Instances of stages may indicate that use of a segment of shared memory is no long required by calling SetNoLongerRequired (instanceID), thereby setting the value 1 in a row of the table corresponding to the calling instance. Table 1b show the state of such a table after a number of calls to the SetNoLongerRequired (instanceID) accessor function.

TABLE 1b

Data Elements For Determining When A Particular
Segment Of Shared Memory Can Be Deallocated

| Path | Instance | In Use (728) | No Longer Required (730) |
| --- | --- | --- | --- |
| 608-610-616 | 608 | 1 | 1 |
| 608-610-616 | 610 | 0 | 0 |
| 608-610-616 | 616 | 0 | 0 |
| 608-612-616 | 608 | 1 | 1 |
| 608-612-616 | 612 | 0 | 0 |
| 608-612-616 | 616 | 0 | 0 |
| 608-614-618 | 608 | 1 | 1 |
| 608-614-618 | 614 | 1 | 1 |
| 608-614-618 | 618 | 0 | 0 |

In Table 1a, the values of No Longer Required (730) have been set to 1 for instances (608) and (614), indicating that the shared memory segment administered by use of data elements in Table 1b is no longer required by instances of stages 1 and 2 in the software pipeline of FIG. 5. Now the values of In Use (728) and No Longer Required (730) in four rows of the table, previously unequal in Table 1a, are now equal. The values of In Use (728) are 1 for instances (608) and (614) and the corresponding values of No Longer Required (730) in the same rows are also now set to 1. Now all values of In Use (728) and No Longer Required (730) are the same in all rows of Table 1a, indicating to a responsible or authorized stage that the shared memory segment administered by the data elements of Table 1b can be deallocated at this time—because the shared memory segment (702) administered by use of the data elements in Table 1a is either not in use or, to the extent that it was in use, no longer required by any instance of stages in any path of execution in the software pipeline (600) of FIG. 5.

Figure 6:
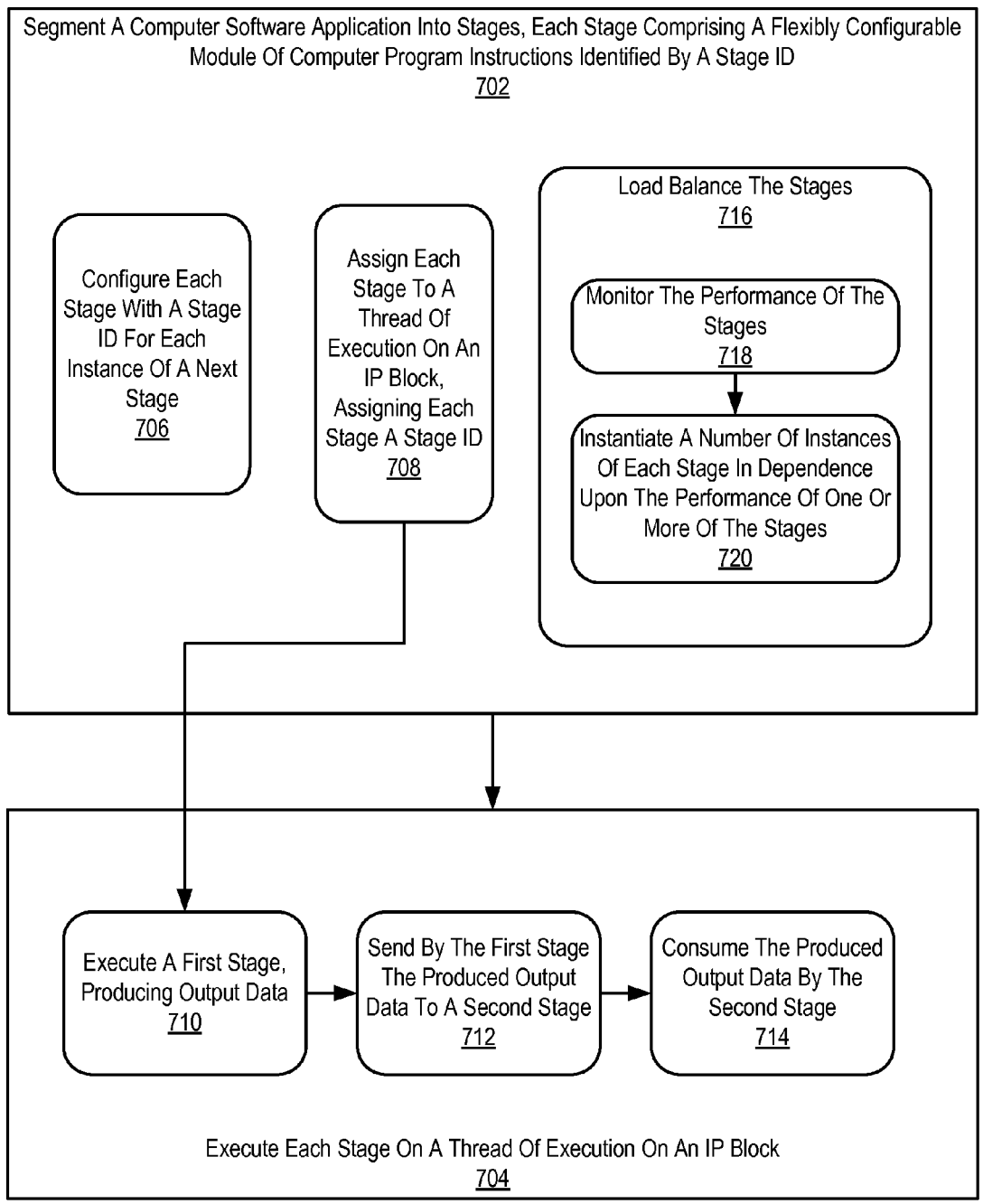
FIG. 6 sets forth a flow chart illustrating an exemplary method of software pipelining on a NOC according to embodiments of the present invention.

For further explanation, FIG. 6 sets forth a flow chart illustrating an exemplary method of software pipelining on a NOC according to embodiments of the present invention. The method of FIG. 6 is implemented on a NOC similar to the ones described above in this specification, a NOC (102 on FIG. 2) that is implemented on a chip (100 on FIG. 2) with IP blocks (104 on FIG. 2), routers (110 on FIG. 2), memory communications controllers (106 on FIG. 2), and network interface controllers (108 on FIG. 2). Each IP block (104 on FIG. 2) is adapted to a router (110 on FIG. 2) through a memory communications controller (106 on FIG. 2) and a network interface controller (108 on FIG. 2). In the method of FIG. 6, each IP block is implemented as a reusable unit of synchronous or asynchronous logic design used as a building block for data processing within the NOC.

The method of FIG. 6 includes segmenting (702) a computer software application into stages, where each stage is implemented as a flexibly configurable module of computer program instructions identified by a stage ID. In the method of FIG. 6, segmenting (702) a computer software application into stages may be carried out by configuring (706) each stage with a stage ID for each instance of a next stage. The method of FIG. 6 also includes executing (704) each stage on a thread of execution on an IP block.

In the method of FIG. 6, segmenting (702) a computer software application into stages also may include assigning (708) each stage to a thread of execution on an IP block, assigning each stage a stage ID. In such an embodiment, executing (704) each stage on a thread of execution on an IP block may include: executing (710) a first stage, producing output data; sending (712) by the first stage the produced output data to a second stage; and consuming (714) the produced output data by the second stage.

In the method of FIG. 6, segmenting (702) a computer software application into stages also may include load balancing (716) the stages, carried out by monitoring (718) the performance of the stages and instantiating (720) a number of instances of each stage in dependence upon the performance of one or more of the stages.

Figure 7:
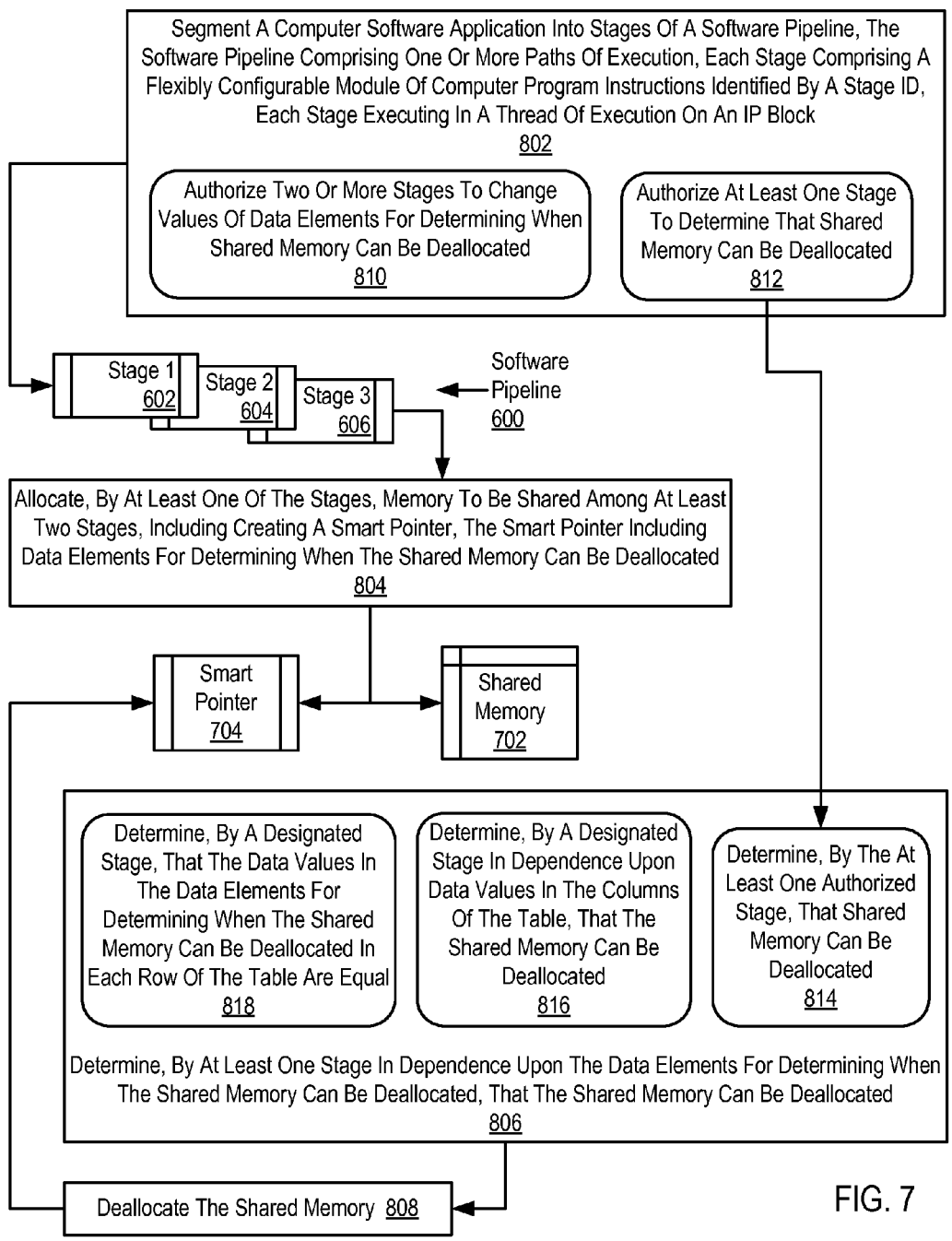
FIG. 7 sets forth a flow chart illustrating an exemplary method of sharing memory in a software pipeline according to embodiments of the present invention.

For further explanation, FIG. 7 sets forth a flow chart illustrating an exemplary method of sharing memory in a software pipeline according to embodiments of the present invention. The method of FIG. 7 is implemented on a NOC similar to the ones described above in this specification, a NOC (102 on FIG. 2) that is implemented on a chip (100 on FIG. 2) with IP blocks (104 on FIG. 2), routers (110 on FIG. 2), memory communications controllers (106 on FIG. 2), and network interface controllers (108 on FIG. 2). Each IP block (104 on FIG. 2) is adapted to a router (110 on FIG. 2) through a memory communications controller (106 on FIG. 2) and a network interface controller (108 on FIG. 2). In the method of FIG. 7, each IP block is implemented as a reusable unit of synchronous or asynchronous logic design used as a building block for data processing within the NOC.

The method of FIG. 7 includes segmenting (802) a computer software application into stages (602-606) of a software pipeline (600). As mentioned above, a software pipeline is a computer software application that is segmented into a set of modules or 'stages' of computer program instructions that cooperate with one another to carry out a series of data processing tasks in sequence. Each stage in a pipeline is composed of a flexibly configurable module of computer program instructions identified by a stage ID with each stage executing on a thread of execution on an IP block on a NOC (102). The stages are 'flexibly configurable' in that each stage may support multiple instances of the stage, so that a pipeline may be scaled by instantiating additional instances of a stage as needed depending on workload. Such a software pipeline typically includes one or more paths of execution among instances of the stages, and each stage is implemented as a flexibly configurable module of computer program instructions identified by a stage ID. Each stage executes in a thread of execution on an IP block of the NOC.

The method of FIG. 7 also includes allocating (804), by at least one of the stages, memory to be shared among at least two stages including creating a smart pointer, the smart pointer including data elements for determining when the shared memory can be deallocated. In the method of FIG. 7, data elements for determining when the shared memory can be deallocated can be implemented in a table that includes at least one row for each path of execution in the pipeline—such as, for example, the tables described above as Tables 1, 1a, and 1b. The table can include a column indicating that a segment of the shared memory is in use by a stage in a path of execution in the pipeline and a column indicating that a segment of the shared memory is no longer required for use by a stage in the path of execution in the pipeline. Taking as an example the smart pointer (704) of FIG. 5, a stage that is designated as responsible or authorized to do so can allocate memory to be shared among stages by instantiating a smart pointer object of a smart pointer class having a structure similar to the one illustrated at reference (704) on FIG. 5. Such an authorized or designated stage can then configure the smart pointer object with a memory pointer (722) identifying a segment of memory to be shared among stages and provide to each stage, or instance of a stage, that is to share the memory segment a reference to the smart pointer object.

The method of FIG. 7 also includes determining (806), by at least one stage in dependence upon the data elements for determining when the shared memory can be deallocated, that the shared memory can be deallocated. In the method of FIG. 7, segmenting (802) a computer software application into stages of a software pipeline may include authorizing (810) two or more stages to change values of data elements for determining when shared memory can be deallocated. Continuing to use the smart pointer (704) of FIG. 5 as an example: stages of a software pipeline can change values of data elements (728, 730) for determining when shared memory can be deallocated by calling accessor functions (724, 726) that set the values of data elements (728, 730) for determining when shared memory can be deallocated in a smart pointer (704) implemented as an object-oriented instance of a smart pointer class.

In the method of FIG. 7, segmenting (802) a computer software application into stages of a software pipeline may include authorizing (812) at least one stage to determine that the shared memory can be deallocated, and determining (804) that the shared memory can be deallocated may include determining (814), by the at least one authorized stage, that the shared memory can be deallocated. Also in the method of FIG. 7, determining (806), by at least one stage in dependence upon the data elements, that the shared memory can be deallocated may include determining (816), by a designated stage in dependence upon data values in the columns of the table, that the shared memory can be deallocated. In the method of FIG. 7, determining (806), by at least one stage in dependence upon the data elements, that the shared memory can be deallocated alternatively may include determining (818), by a designated stage, that the data values in the data elements for determining when the shared memory can be deallocated in each row of the table are equal.

As described above with reference to Tables 1, 1a, and 1b, in an embodiment that uses the same initial data values and the same values to indicate 'in use' and 'no longer required,' the fact that each row contains the same value in both its 'in use' and 'no longer required' fields can be taken to mean that a shared memory segment is eligible for deallocation. The requirement in such an embodiment is that the corresponding values in each row are the same. In such an embodiment, however, there is no requirement that all values in all such fields across rows be the same. Table 1b illustrates this fact. Looking down the In Use (728) and the No Longer Required (730) columns, the values of the fields vary across rows. Both the In Use and the No Longer Required values within any single row, however, are all equal in Table 1b. All four sets of In Use and No Longer Required values for instances (608, 614) are set to 1. All remaining two-sets of In Use and No Longer Required are set to 0. Table 1b therefore depicts data elements for determining when shared memory can be deallocated indicating that the share memory controlled by these data elements is in a condition to be deallocated.

The method of FIG. 7 also includes deallocating (808) the shared memory. Continuing with the smart pointer (704) of FIG. 5 as an example: stages of a software pipeline can deallocate shared memory by resetting a member variable established for that purpose in the smart pointer (704) and named, for example, "Allocated" (723). In an embodiments where allocating shared memory is carried out by providing to each sharing stage, or to each sharing instance of a stage, a reference to a smart pointer object, so resetting a Boolean Allocate variable to FALSE, for example, effectively and immediately deallocates the share memory across all sharing instances of stages. Any stage or instance of a stage still in possession of such a reference to a smart pointer object attempting to register shared memory as In Use (728) by calling an accessor function such as SetInUse( ) (724) would find the SetInUse( ) programmed to check the value of the Allocated (723) variable and, if the value of Allocated indicates deallocation, return an error code or throw an exception.

Exemplary embodiments of the present invention are described largely in the context of a fully functional computer system for software pipelining on a NOC. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of sharing memory in a software pipeline, the method implemented on a network on chip ('NOC'), the NOC comprising integrated processor ('IP') blocks, routers, memory communications controllers, and network interface controllers, each IP block operatively coupled to a router through a memory communications controller and a network interface controller, each memory communications controller controlling communication between an IP block and memory, and each network interface controller controlling inter-IP block communications through routers, the method comprising:

allocating, by a stage of a software pipeline, memory to be shared among at least two stages of the software pipeline, including creating a smart pointer, the smart pointer including data elements for determining when the shared memory can be deallocated, wherein data elements for determining when the shared memory can be deallocated further comprise a table comprising at least one row for each path of execution in the pipeline, the table further comprising a column indicating that a segment of the shared memory is in use by a stage in a path of execution in the pipeline, the table further comprising a column indicating that a segment of the shared memory is no longer required for use by a stage in the path of execution in the pipeline;

deallocating the shared memory based on the table within the data elements of the smart pointer.

2. The method of claim 1 further comprising authorizing two or more stages to change values of the data elements for determining when the shared memory can be deallocated.

3. The method of claim 1 further comprising:

authorizing at least one stage to determine that the shared memory can be deallocated; and determining, by the at least one authorized stage, that the shared memory can be deallocated.

4. The method of claim 1 further comprising determining, by a designated stage in dependence upon data values in the columns of the table, that the shared memory can be deallocated.

5. The method of claim 1 further comprising determining, by a designated stage, that data values in the data elements for determining when the shared memory can be deallocated in each row of the table are equal.

6. A network on chip ('NOC') for sharing memory in a software pipeline, the NOC comprising integrated processor ('IP') blocks, routers, memory communications controllers, and network interface controllers, each IP block operatively coupled to a router through a memory communications controller and a network interface controller, each memory communications controller controlling communication between an IP block and memory, and each network interface controller controlling inter-IP block communications through routers, the NOC further comprising:

memory allocated by at least one stage of a pipeline to be shared among at least two stages of the pipeline, including a smart pointer, the smart pointer including data elements for determining when the shared memory can be deallocated, wherein data elements for determining when the shared memory can be deallocated further comprise a table comprising at least one row for each path of execution in the pipeline, the table further comprising a column indicating that a segment of the shared memory is in use by a stage in a path of execution in the pipeline, the table further comprising a column indicating that a segment of the shared memory is no longer required for use by a stage in the path of execution in the pipeline.

7. The NOC of claim 6 wherein the pipeline further comprises two or more stages authorized to change values of the data elements for determining when the shared memory can be deallocated.

8. The NOC of claim 6 wherein:

the pipeline further comprises at least one stage authorized to determine that the shared memory can be deallocated.

9. The NOC of claim 6 wherein one of the stages is designated responsible for determining, in dependence upon data values in the columns of the table, that the shared memory can be deallocated.

10. The NOC of claim 6 wherein one of the stages is designated responsible for determining, when data values in the data elements for determining when the shared memory can be deallocated in each row of the table are equal, that the shared memory can be deallocated.

11. A computer program product for sharing memory in a software pipeline on a network on chip ('NOC'), the NOC comprising integrated processor ('IP') blocks, routers, memory communications controllers, and network interface controllers, each IP block operatively coupled to a router through a memory communications controller and a network interface controller, each memory communications controller controlling communication between an IP block and memory, and each network interface controller controlling inter-IP block communications through routers, the computer program product including computer program instructions disposed in a recordable computer readable medium, the computer program instructions that when executed by a computer cause the computer to carry out the steps of:

allocating, by at least one of the stages, memory to be shared among at least two stages including creating a smart pointer, the smart pointer including data elements for determining when the shared memory can be deallocated, wherein the data elements for determining when the shared memory can be deallocated further comprise a table comprising at least one row for each path of execution in the pipeline, the table further comprising a column indicating that a segment of the shared memory is in use by a stage in a path of execution in the pipeline, the table further comprising a column indicating that a segment of the shared memory is no longer required for use by a stage in the path of execution in the pipeline;

deallocating the shared memory based on the table within the data elements of the smart pointer.

12. The computer program product of claim 11 further comprising computer program instructions that when executed by a computer cause the computer to carry out the steps of: authorizing two or more stages to change values of the data elements for determining when the shared memory can be deallocated.

13. The computer program product of claim 11 further comprising computer program instructions that when executed by a computer cause the computer to carry out the steps of:

authorizing at least one stage to determine that the shared memory can be deallocated; and determining, by the at least one authorized stage, that the shared memory can be deallocated.

14. The computer program product of claim 11 further comprising computer program instructions that when executed by a computer cause the computer to carry out the steps of: determining, by a designated stage in dependence upon data values in the columns of the table, that the shared memory can be deallocated.

15. The computer program product of claim 11 further comprising computer program instructions that when executed by a computer cause the computer to carry out the steps of: determining, by a designated stage, that data values in the data elements for determining when the shared memory can be deallocated in each row of the table are equal.

* * * * *